United States Patent [19]
Paananen

[11] 3,815,702
[45] June 11, 1974

[54] AUTOMOTIVE DRIP PAD ASSEMBLY

[76] Inventor: Reuben R. Paananen, 4847 Townley, Glendale, Ariz. 85301

[22] Filed: Oct. 12, 1972

[21] Appl. No.: 297,084

[52] U.S. Cl. .............................................. 180/69.1
[51] Int. Cl. .............................................. B62d 25/20
[58] Field of Search ............ 180/69.1, 68.5; 248/17, 248/327, 326; 211/117, 76; 108/149, 59, 102

[56] References Cited
UNITED STATES PATENTS

| | | | |
|---|---|---|---|
| 1,552,934 | 9/1925 | Lawrence | 248/327 |
| 2,468,412 | 4/1949 | Schaefer | 108/149 |
| 2,558,323 | 6/1951 | Strun | 108/149 |
| 2,931,453 | 4/1960 | Inglese | 180/69.1 |
| 3,143,980 | 8/1964 | Sperring | 108/149 X |
| 3,329,231 | 7/1967 | Takenouchi | 180/69.1 |
| 3,355,132 | 11/1967 | Jenkins | 248/327 X |
| 3,651,884 | 3/1972 | Dorries | 180/69.1 |
| 3,669,204 | 6/1972 | Andrews | 180/69.1 |

Primary Examiner—David Schonberg
Assistant Examiner—David M. Mitchell
Attorney, Agent, or Firm—William H. Drummond

[57] ABSTRACT

A drip pad assembly adapted for semi-permanent attachment to an automobile to catch oil and grease leaks from the engine and transmission comprises a generally rectangular pad consisting of a lower oil-impermeable sheet and an upper oil-absorbent layer. Rigid, generally U-shaped brackets support the front and rear ends of the pad. The upright members are adapted for attachment, respectively, to oil pan mounting bolts and to transmission case bolts. The length of the upright members of the supporting brackets is adjustable. The pad is provided with a plurality of mounting holes along both side edges. The brackets are provided with upstanding stud members to engage the mounting holes to locate the pad on the support brackets.

2 Claims, 4 Drawing Figures

PATENTED JUN 11 1974  3,815,702
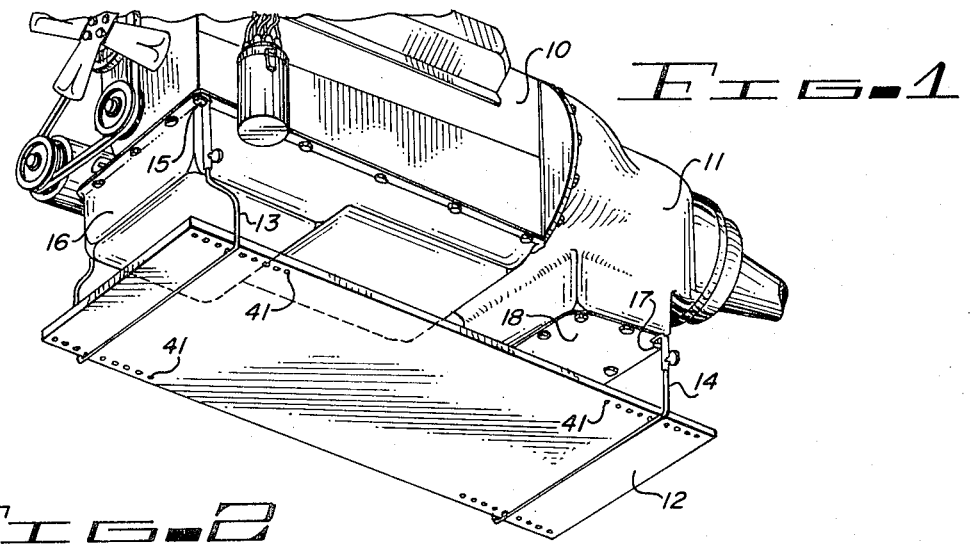
Fig-1
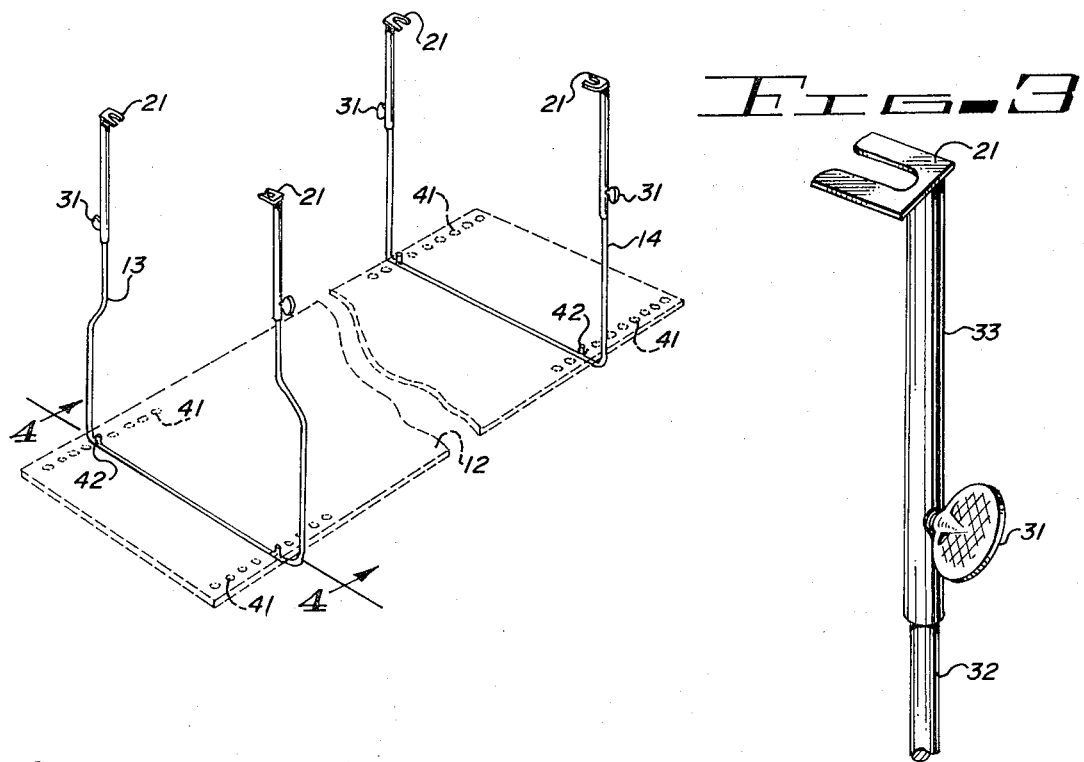
Fig-2
Fig-3
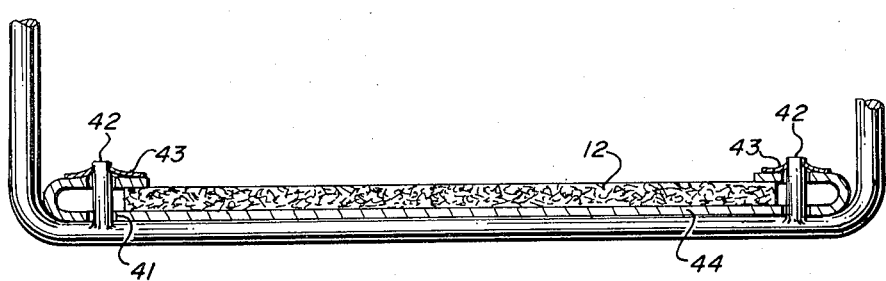
Fig-4

AUTOMOTIVE DRIP PAD ASSEMBLY

This invention relates to an automotive drip pad assembly.

More particularly, the invention concerns a drip pad assembly adapted for semi-permanent attachment to an automobile to catch oil and grease leaks from the engine and transmission to prevent staining of surfaces below the automobile such as driveways, garage floors, etc.

In a further and more particular respect, the invention relates to an automotive drip pad assembly especially adapted for semi-permanent attachment to a wide variety of makes of automobiles, trucks and other vehicles.

Drip pad assemblies adapted for direct attachment to an automobile or truck to prevent oil and grease leaks from staining a supporting floor are known. In general, these drip pads consist of a material which absorbs the oil or grease and which are semi-permanently attachable to an automobile by various expedients such as drawstrings, spring tie members, etc. To date, however, no satisfactory assembly has been devised which permits such a drip pad assembly to be adjustably attached to various makes and sizes of automobiles, trucks and other vehicles.

It is therefore an object of the present invention to provide an automotive drip pad assembly specially adapted for semi-permanent attachment to a wide variety of makes and sizes of vehicles.

Another object of the invention is to provide such a drip pad assembly which is simple to install and remove and which can be mounted on the vehicle in such a way as to avoid contact or interference with engine components, hot exhaust lines, etc.

These and other objects and advantages of the invention will be apparent to those skilled in the art from the following detailed description thereof taken in conjunction with the drawings, in which:

FIG. 1 is a perspective view of a drip pad assembly embodying the present invention affixed to a typical engine-transmission assembly of a conventional automobile or truck;

FIG. 2 is a perspective view of the drip pad assembly of FIG. 1 showing further details of the mounting brackets;

FIG. 3 is a perspective view of one upright member of the support brackets of FIGS. 1-2 showing in greater detail the means for attachment of the support bracket to the automobile and the means for adjusting the length of the upright member; and FIG. 4 is a sectional view of the pad and bracket assembly of FIGS. 1-2 taken along section line 4—4 of FIG. 2 and illustrating in further detail the construction of the pad assembly and the mode of supporting the pad assembly on the mounting brackets.

Briefly, in accordance with my invention, I provide a drip pad assembly especially adapted for semipermanent attachment to an automobile to catch oil and grease leaks from the engine and transmission. The drip pad assembly comprises a generally rectangular pad which includes a lower oil impermeable sheet, and an upright oil-absorbent layer supported by said lower sheet. The pad is supported proximate its front and rear edges by rigid, generally U-shaped brackets, each bracket comprising a horizontal support portion and upright members, the terminal ends of which are specially adapted for attachment to the engine and transmission. The front bracket is attached to the engine oil pan mounting bolts and the rear bracket is attached to convenient transmission case bolts.

In the preferred embodiment, the length of the upright portions of the U-shaped brackets is vertically adjustable so as to support the pad in operative position despite variations in the size and exact configuration of various motor-transmission assemblies.

In accordance with a further preferred embodiment of the invention, the pad is provided with a plurality of mounting holes along both sides thereof and the brackets are provided with upstanding stud members which engage the mounting holes to locate the pad on the support brackets in varying positions to allow for proper positioning of the pad under various specific sizes and configurations of engine-transmission assemblies.

Turning now to the drawings, in which the presently preferred embodiment of the invention is depicted for illustrative purposes, FIG. 1 depicts an engine 10 and transmission 11 in a conventional automobile or truck (not shown). The pad member, generally indicated by reference character 12, is supported beneath the engine 10 and transmission 11 by a generally U-shaped bracket 13 depending below the front of the engine 10 and another generally U-shaped bracket 14 depending below the transmission 11. As will be observed, the upper ends of the U-shaped bracket 13 are attached to the engine 10 by means of the bolts 15 conventionally employed to mount the oil pan 16 on the engine 10 to enclose the crankcase thereof. The upper ends of the U-shaped bracket 14 are affixed to the transmission housing 11 by means of transmission case bolts 17 conventionally employed to secure a transmission access port cover 18 to the transmission case 11.

The method of attachment of the upper ends of the support brackets 13 and 14 to the engine is further illustrated in FIGS. 2-3. As shown in the drawings, the upper ends are provided with slotted members 21 which are received under the respective oil pan mounting bolts 15 and transmission case bolts 17 (see FIG. 1). The length of the upright portions of the brackets 13 and 14 can be adjusted by loosening the thumb-nut 31, sliding the lower portion 32 of the bracket upwardly or downwardly within the sleeve 33 and retightening the thumb-nut 31.

As depicted in FIGS. 1, 2 and 4, the pad 12 is provided with a plurality of holes 41 along the side edges of the pad 12. The support brackets 13 and 14 are provided with upstanding studs 42 which engage the mounting holes 41 to locate the pad in proper operative position on the support brackets 13 and 14. After the pad is properly positioned, it is secured in its proper operative position by sliding conventional speed-nuts 43 over the upper ends of the studs 42.

The construction of the pad assembly is further illustrated in FIG. 4. The pad consists of a sandwich of a lower oil-impermeable sheet 44 such as metal or plastic which is bent double at its edges. A suitable pad of oil-absorbent material 46 is compressed under the upper edge of the sheet 44. As will be apparent to those skilled in the art, the oil-absorbent layer 46 can be fabricated from a wide variety of materials. Illustratively, according to the preferred embodiment, the oil-absorbent layer is a sheet of compressed asbestos fibers.

Having fully described my invention in such clear and concise terms as to enable those skilled in the art to understand and practice it, and having identified the presently preferred embodiments of the invention, I claim:

1. A drip pad assembly for semi-permanent attachment to an automobile to catch oil and grease leaks from the engine and transmission and especially adapted to be expediently removed and replaced for cleaning, said drip pad assembly comprising:
   a. a generally rectangular pad comprising
      i. a lower oil-impermeable sheet,
      ii. an upper oil-absorbent layer supported by said lower sheet, and
      iii. means defining a plurality of mounting holes aligned along two opposite sides of said lower sheet;
   b. a pair of rigid generally U-shaped brackets supporting the front and rear ends of said pad, each said bracket comprising
      i. a pair of upstanding stud members on the bight of said U-shaped bracket sized and spaced to engage a corresponding pair of said mounting holes,
      ii. means engageable with each said stud member for releasably securing said sheet to said bight, and
      iii. means for adjusting the length of the upright portions of said U-shaped bracket, including a sleeve telescopically receiving and selectively retaining said upright portions and
      iv. means carried by the upper end of each sleeve for attachment to the bolts of said engine and said transmission.

2. The drip pad assembly of claim 1 wherein the edges of said lower sheet are doubled over the edges of said oil-absorbent sheet to removably retain said oil-absorbent sheet.

* * * * *